(12) United States Patent
Tanaka et al.

(10) Patent No.: US 11,408,839 B2
(45) Date of Patent: Aug. 9, 2022

(54) PROCESSING DEVICE

(71) Applicant: OMRON Corporation, Kyoto (JP)

(72) Inventors: Masahito Tanaka, Kyoto (JP); Mamoru Egi, Kyoto (JP); Yasushi Ono, Kyoto (JP)

(73) Assignee: OMRON Corporation, Kyoto (JP)

( * ) Notice: Subject to any disclaimer, the term of this patent is extended or adjusted under 35 U.S.C. 154(b) by 434 days.

(21) Appl. No.: 16/354,210

(22) Filed: Mar. 15, 2019

(65) Prior Publication Data
US 2020/0011820 A1    Jan. 9, 2020

(30) Foreign Application Priority Data

Jul. 3, 2018  (JP) .............................. JP2018-126827

(51) Int. Cl.
  *G01N 25/00*  (2006.01)
  *H02P 29/60*  (2016.01)
  (Continued)

(52) U.S. Cl.
  CPC ............... *G01N 25/00* (2013.01); *G01K 7/16* (2013.01); *G06F 30/20* (2020.01); *H02P 29/60* (2016.02); *G06F 2111/10* (2020.01)

(58) Field of Classification Search
  CPC ......... G01N 25/00; H02P 29/60; G06F 30/20; G06F 2111/10; G01K 7/16
  See application file for complete search history.

(56) References Cited

U.S. PATENT DOCUMENTS

| | | | |
|---|---|---|---|
| 4,083,001 A * | 4/1978 | Paice | ....................... G01K 7/16 |
| | | | 324/754.29 |
| 6,949,945 B2 * | 9/2005 | Klein | .................... H02H 6/005 |
| | | | 374/185 |

(Continued)

FOREIGN PATENT DOCUMENTS

| | | |
|---|---|---|
| CN | 101366162 | 2/2009 |
| CN | 102809440 | 12/2012 |

(Continued)

OTHER PUBLICATIONS

"Search Report of Europe Counterpart Application", dated May 9, 2019, p. 1-p. 9.

(Continued)

*Primary Examiner* — Alexander Satanovsky
*Assistant Examiner* — Lynda Dinh
(74) *Attorney, Agent, or Firm* — JCIPRNET

(57) ABSTRACT

The processing device includes: a temperature transition acquisition unit that acquires rising transition of the temperature of the winding in a state in which a first voltage is applied in order to raise a temperature of the winding to a first temperature and further acquires falling transition of the temperature of the winding in a state in which a second voltage is applied in order to lower the temperature of the winding to a second temperature that is lower than the first temperature after the temperature of the winding converges to the first temperature; and a decision unit that calculates stator-related parameters on the basis of the falling transition to decide a stator temperature characteristic mode and further calculates winding-related parameters on the basis of the rising transition and a stator temperature characteristic model to decide a winding temperature characteristic model.

11 Claims, 9 Drawing Sheets

(51) Int. Cl.
  *G06F 30/20*   (2020.01)
  *G01K 7/16*    (2006.01)
  *G06F 111/10*  (2020.01)

(56) References Cited

U.S. PATENT DOCUMENTS

| | | | | |
|---|---|---|---|---|
| 7,570,074 | B2 * | 8/2009 | Gao | H02P 29/64 |
| | | | | 324/765.01 |
| 7,839,108 | B2 * | 11/2010 | Patel | H02H 7/0852 |
| | | | | 318/432 |
| 8,421,391 | B2 * | 4/2013 | Yeh | H02K 11/20 |
| | | | | 318/432 |
| 8,967,857 | B2 * | 3/2015 | Senoo | G01K 13/00 |
| | | | | 374/141 |
| 2012/0306422 | A1 | 12/2012 | Hao et al. | |

FOREIGN PATENT DOCUMENTS

| | | |
|---|---|---|
| CN | 107181444 | 9/2017 |
| EP | 3217539 | 9/2017 |
| JP | H09261850 | 10/1997 |
| JP | 2009033895 A * | 2/2009 |
| JP | 2011015584 | 1/2011 |
| JP | 2017063540 | 3/2017 |

OTHER PUBLICATIONS

Office Action of China Counterpart Application, with English translation thereof, dated Mar. 31, 2021, pp. 1-21.

\* cited by examiner

PROCESSING DEVICE

CROSS-REFERENCE TO RELATED APPLICATION

This application claims the priority benefit of Japan Application No. 2018-126827, filed on Jul. 3, 2018. The entirety of the above-mentioned patent application is hereby incorporated by reference herein and made a part of this specification.

BACKGROUND

Technical Field

The present disclosure relates to a processing device that adjusts model parameters in relation to electronic thermals for a motor.

Description of Related Art

Motors have been used in a variety of fields, and there are also various rotation speeds, motor loads, and the like as utilization conditions. In addition, the atmosphere in the surroundings of a motor is not necessarily constant, and it typically becomes more difficult to release heat from a motor as the temperature in the surroundings of the motor increases, which leads to a severe utilization environment. In a case in which a motor is driven, a winding temperature of the motor may excessively rise, and a winding may be burned if the motor is placed in an environment with an excessive load. In order to avoid such burning of a winding, there is a technology for avoiding running of a motor under an excessive load by incorporating a temperature sensor such as a thermistor or a thermostat into the motor and directly measuring the temperature of the winding with the temperature sensor. However, in such a case, it is necessary to incorporate the temperature sensor into the motor, and if the temperature sensor is not accurately disposed at a predetermined position, it becomes difficult to appropriately measure the temperature of the winding.

Thus, a technology in relation to electronic thermals for calculating load conditions from commands regarding a current to be caused to flow through a motor and determining an excessive temperature rise of a winding without using a direct sensor such as a temperature sensor is being developed. In regard to such electronic thermals, the excessive temperature rise of the winding is determined using software. According to a technology disclosed in Patent Document 1, for example, a winding resistance value is estimated on the basis of parameters such as a voltage and a current applied to a motor and a dielectric voltage of the motor, and a winding temperature is estimated from the estimated winding resistance value. Also, according to a technology disclosed in Patent Document 2, a winding temperature at the time of actuating a motor is estimated from a winding resistance value measured at the time of the actuating, and transition of a winding temperature is then estimated on the basis of a current that is caused to flow through the motor.

PATENT DOCUMENTS

[Patent Document 1] Japanese Patent Laid-Open No. 2011-15584
[Patent Document 2] Japanese Patent Laid-Open No. H9-261850

In order to avoid an excessive temperature rise of a winding using electronic thermal technology, it is preferable for various factors related to the motor to be clear. That is, it is possible to more accurately estimate the temperature of a winding if physical parameters such as a resistance value of the winding and a dielectric voltage of the motor in relation to the temperature of the winding are known. However, in a case in which a motor is driven using a driver, the physical parameters of the motor are not necessarily known. In such a case, there is a concern that it may be difficult to accurately inhibit an excessive temperature rise of the winding using the electronic thermal technology even if it is possible to drive the motor with the driver.

Also, since the winding is wound around the stator in terms of a structure of the motor, the winding may also be thermally affected by the stator. That is, in order to determine an excessive temperature rise of the winding, estimation of the temperature transition of only the winding is not sufficient, and it is considered to be preferable to determine the excessive temperature rise by estimating the temperature of the winding in consideration of a correlation between the stator and the winding. However, the related art does not include sufficient mention of a thermal correlation between the stator and the winding.

SUMMARY

The present disclosure provides a technology for precisely estimating a temperature of a winding in relation to an electronic thermal of a motor.

The present disclosure employs a configuration in which a stator temperature characteristic model and a winding temperature characteristic model for an electronic thermal of a motor are decided on the basis of rising transition and falling transition when a voltage is applied to the motor, the temperature of the winding is raised, different voltages are then applied, and the temperature of the winding is lowered. It is possible to more accurately estimate the temperature of the winding of the motor by the electronic thermal by deciding the characteristic model related to the stator and the characteristic model related to the winding in this manner.

In detail, according to an embodiment of the present disclosure, there is provided a processing device that decides a calculation model, the calculation model being included in an electronic thermal of a motor that has a stator around which a winding is wound and a rotor to estimate a temperature of the winding and including a winding temperature characteristic model that includes winding-related parameters in relation to temperature characteristics of the winding and a stator temperature characteristic model that includes stator-related parameters in relation to temperature characteristics of the stator, the processing device including: a temperature transition acquisition unit that acquires a rising transition of the temperature of the winding in a state in which a first voltage is applied in order to raise the temperature of the winding to the first temperature and further acquires a falling transition of the temperature of the winding in a state in which a second voltage is applied in order to lower the temperature of the winding to a second temperature that is lower than the first temperature after the temperature of the winding converges on the first temperature; and a decision unit that calculates the stator-related parameters on the basis of the falling transition to decide the stator temperature characteristic model and further calculates the winding-related parameters on the basis of the rising transition and the decided stator temperature characteristic model to decide the winding temperature characteristic model.

The processing device according to the present disclosure applies the second voltage for lowering the temperature of the winding after applying the first voltage for raising the temperature of the winding. The application of the second voltage may be any voltage application as long as the temperature of the winding is lowered and converges on the second temperature and includes a mode in which no voltage is applied to the winding at all. The stator-related parameters are calculated on the basis of the falling transition by paying attention to the fact that thermal characteristics of the stator of the motor are dominant in the falling transition of the temperature of the winding at this time, thereby deciding the stator temperature characteristic model. The stator temperature characteristic model is a model for calculating temperature characteristics of the stator when thermal influences of the winding are virtually excluded from the motor. As the stator-related parameters included in the model, a heat resistance, a thermal time constant, and the like related to the stator can be exemplified.

Also, although each of the stator and the winding of the motor affects the rising transition of the temperature of the winding when the first voltage is applied, the winding-related parameters are calculated and the winding temperature characteristic model is decided by subtracting influences of the stator estimated on the basis of the stator temperature characteristic model since the stator temperature characteristic model is previously decided as described above. The winding temperature characteristic model is a model for calculating the temperature characteristics of the winding when thermal influences of the stator are virtually excluded from the motor. Note that as the winding-related parameters included in the model, a heat resistance, a thermal time constant, and the like related to the winding can be exemplified. The stator temperature characteristic model and the winding temperature characteristic model related to the electronic thermal are decided in this manner, and estimation of the temperature of the winding is realized in consideration of a thermal correlation between the stator and the winding, using both models. In addition, since both models for the electronic thermal are decided using the measured temperature transition in the aforementioned processing device, it is possible to apply the aforementioned processing device even in a case in which physical parameter values of the motor are not known and thereby to accurately estimate the temperature of the winding in the electronic thermal.

In the aforementioned processing device, the temperature transition acquisition unit may acquire the rising transition and the falling transition on the basis of a resistance value of the winding. In this manner, it is not necessary to dispose a detection device for measuring a transition of the temperature of the winding in the motor when the stator temperature characteristic model and the winding temperature characteristic model are decided.

Also, the aforementioned processing device may further include: a frequency response acquisition unit that acquires a frequency response in the motor when a voltage applied to the winding is used as an input and a current flowing through the winding is used as an output; and a resistance calculation unit that calculates a resistance value of the winding on the basis of the frequency response. It is possible to minimize the voltage applied to the winding for detecting the resistance value of the winding as much as possible, to inhibit variation in the temperature of the winding due to the application of the voltage, and to more accurately measure the resistance value of the winding by paying attention to electric characteristics of the winding and using the frequency response in this manner.

Also, in the aforementioned processing device, a voltage of a first cycle may be applied in the application of the first voltage, and a voltage of a second cycle may be applied in the application of the second voltage. In that case, the resistance calculation unit may calculate the resistance value of the winding when the first voltage is applied on the basis of the frequency response acquired by the frequency response acquisition unit in accordance with an output current of the motor when the application of the voltage of the first cycle is input, and may calculate the resistance value of the winding when the second voltage is applied on the basis of the frequency response acquired by the frequency response acquisition unit in accordance with an output current of the motor when the application of the voltage of the second cycle is input, and the temperature transition acquisition unit may acquire the rising transition and the falling transition on the basis of the resistance value of the winding calculated by the resistance calculation unit. With such a configuration, the application of the first voltage for the rising transition also serves as an application of a voltage for measuring the resistance value of the winding in relation to the rising transition, and the application of the second voltage for the falling transition also serves as an application of a voltage for measuring the resistance value of the winding in relation to the falling transition. Therefore, it is possible to inhibit variation in the temperature of the winding and to more accurately measure the resistance value of the winding in relation to the measurement of the rising transition and the falling transition.

Also, in the aforementioned processing device, the temperature transition acquisition unit may acquire the rising transition and the falling transition in a state in which the rotor does not rotate, and the decision unit may decide the stator temperature characteristic model and the winding temperature characteristic model on the basis of the rising transition and the falling transition acquired in a state in which the rotor does not rotate. In addition, the aforementioned processing device may further include: a temperature-transition-during-rotation acquisition unit that applies a third voltage for raising the temperature of the winding in a state in which the rotor is caused to rotate at a predetermined rotation speed and acquires a rising transition during rotation, which is temperature transition of the winding; an estimation unit that estimates a convergence temperature of the winding in the rising transition during rotation on the basis of a voltage application condition at the time of the application of the third voltage and the stator temperature characteristic model and the winding temperature characteristic model decided by the decision unit; and an updating unit that updates the stator temperature characteristic model decided by the decision unit to a new stator temperature characteristic model on the basis of a convergence temperature of the winding in the acquired rising transition during rotation and the estimated convergence temperature of the winding. With such a configuration, it is possible to estimate the temperature of the winding in consideration of the influence of iron loss occurring in the stator for the stator temperature characteristic model. Note that the third temperature may be the same temperature as the aforementioned first temperature or may be a different temperature.

Also, the present disclosure can also be considered in terms of a method of deciding a winding temperature calculation model. That is, according to another embodiment of the present disclosure, there is provided a method of deciding a calculation model, the calculation model being included in an electronic thermal of a motor that has a stator around which a winding is wound and a rotor to estimate a temperature of the winding and including a winding temperature characteristic model that includes winding-related parameters in relation to temperature characteristics of the winding and a stator temperature characteristic model that includes stator-related parameters in relation to temperature characteristics of the stator. The method includes: acquiring a rising transition of the temperature of the winding in a state in which a first voltage is applied in order to raise the temperature of the winding to a first temperature; acquiring a falling transition of the temperature of the winding in a state in which a second voltage is applied in order to lower the temperature of the winding to a second temperature that is lower than the first temperature after the temperature of the winding converges on the first temperature; calculating the stator-related parameters on the basis of the falling transition and deciding the stator temperature characteristic model; and calculating the winding-related parameters on the basis of the rising transition and the decided stator temperature characteristic model and deciding the winding temperature characteristic model. Also, the technical idea disclosed in relation to the aforementioned processing device can be applied to the aforementioned program for deciding a winding temperature calculation model as long as there are no technical conflicts.

Also, the present disclosure can also be considered in terms of a program for deciding a winding temperature calculation model. That is, according to yet another embodiment of the present disclosure, there is provided a program for deciding a winding temperature calculation model that causes a processing device configured to decide the calculation model, the calculation model being included in an electronic thermal of a motor that has a stator around which a winding is wound and a rotor to estimate a temperature of the winding and including a winding temperature characteristic model that includes winding-related parameters in relation to temperature characteristics of the winding and a stator temperature characteristic model that includes stator-related parameters in relation to temperature characteristics of the stator, the processing device including: acquiring a rising transition of the temperature of the winding in a state in which a first voltage is applied in order to raise the temperature of the winding to a first temperature; acquiring a falling transition of the temperature of the winding in a state in which a second voltage is applied in order to lower the temperature of the winding to a second temperature that is lower than the first temperature after the temperature of the winding converges on the first temperature; calculating the stator-related parameters on the basis of the falling transition and deciding the stator temperature characteristic model; and calculating the winding-related parameters on the basis of the rising transition and the decided stator temperature characteristic model and deciding the winding temperature characteristic model. Also, the technical idea disclosed in relation to the aforementioned processing device can be applied to the aforementioned program for deciding a winding temperature calculation model as long as there are no technical conflicts.

Also, according to yet another embodiment of the present disclosure, there is provided a processing device that decides a calculation model, the calculation model being included in an electronic thermal of a motor that has a stator around which a winding is wound and a rotor to estimate a temperature of the winding and including a winding temperature characteristic model that includes winding-related parameters in relation to temperature characteristics of the winding and a known stator temperature characteristic model that includes stator-related parameters in relation to temperature characteristics of the stator, the processing device including: a temperature transition acquisition unit that acquires a rising transition at which the temperature of the winding converges on a first temperature in a state in which a first voltage is applied in order to raise the temperature of the winding to the first temperature; and a decision unit that calculates the winding-related parameters on the basis of the rising transition and the known stator temperature characteristic model and decides the winding temperature characteristic model.

It is possible to accurately estimate the temperature of the winding in relation to the electronic thermal of the motor.

DESCRIPTION OF THE EMBODIMENTS

Application Example

Figure 1:
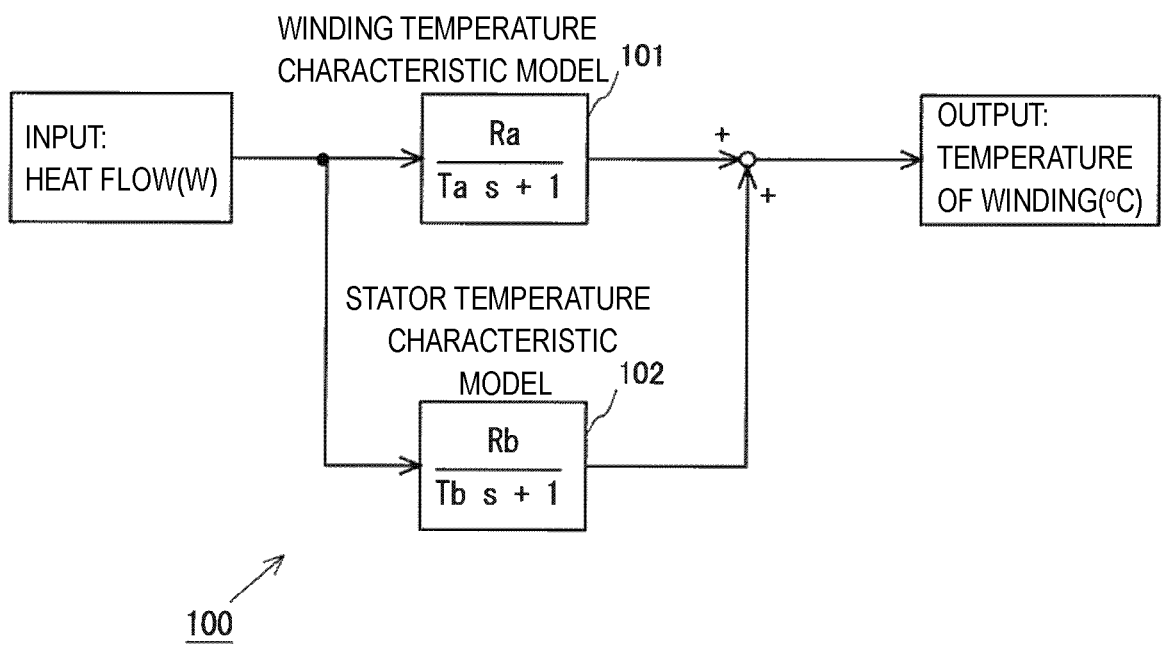
FIG. 1 is a first diagram illustrating a configuration of a calculation model including a winding temperature characteristic model and a stator temperature characteristic model.
Figure 2:
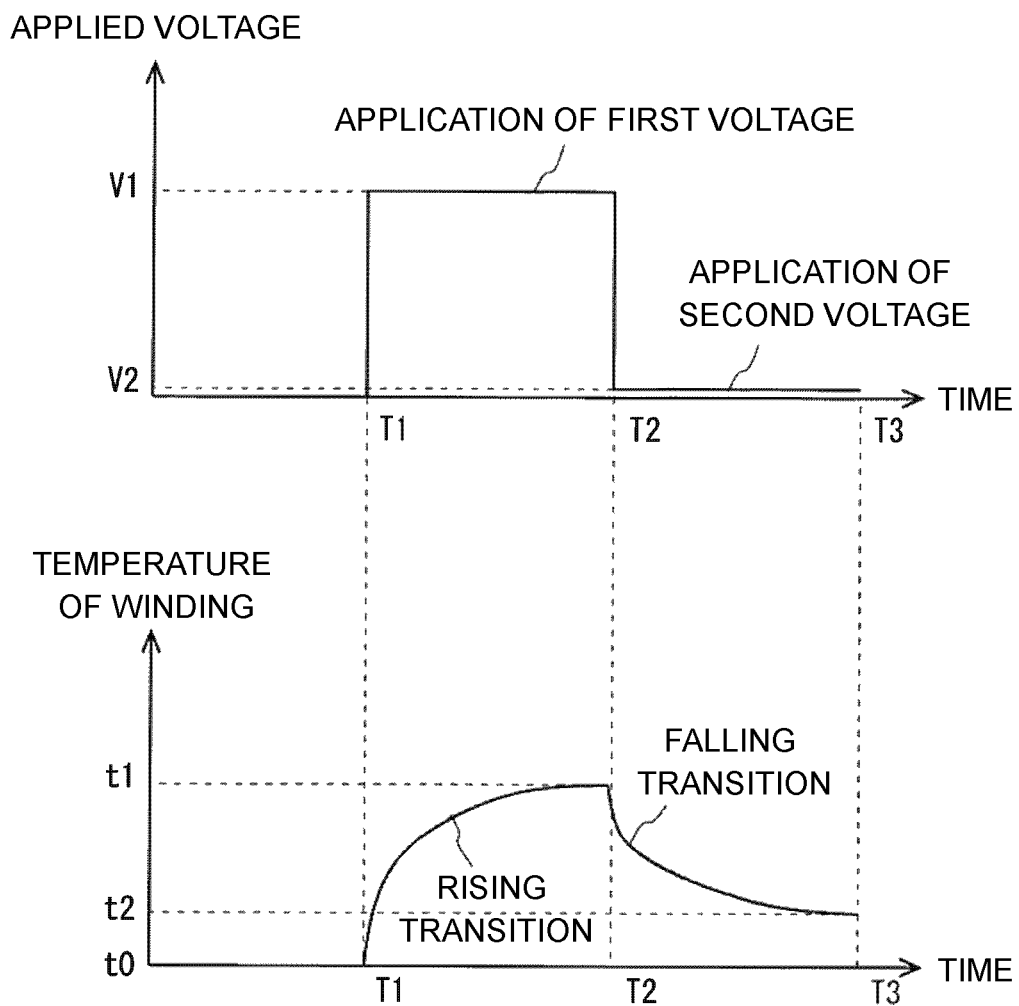
FIG. 2 is a diagram illustrating transition of a voltage to be applied to a motor when a calculation model is adapted to the motor and a transition of a winding temperature at that time.

An example of a processing device that adjusts model parameters for estimating a temperature of a winding of a motor in an electronic thermal in the motor provided with the electronic thermal will be described with reference to FIGS. 1 and 2. Note that the motor can have any configuration in which a winding is wound around a stator and a rotor is included in an embodiment of the present disclosure, and a specific configuration thereof is not limited. Here, FIG. 1 illustrates a schematic structure of a calculation model 100 that is included in the electronic thermal of the motor to calculate the temperature of the winding. Also, FIG. 2 is a diagram illustrating transition of a voltage applied to the motor when parameters for calculation used in the calculation model illustrated in FIG. 1, that is, winding-related parameters and stator-related parameters, are decided and a transition of the temperature of the winding at that time.

The calculation model 100 included in the electronic thermal will be described with reference to FIG. 1. The calculation model 100 is a program for calculating the temperature of the winding of the motor in the electronic thermal of the motor, and if a heat flow in the motor is given as an input, the temperature of the winding of the motor is output. Note that the heat flow can be considered as so-called copper loss caused by an electric resistance of a winding coil of the motor and is proportional to a square of a current flowing through the winding coil. Also, the calculation model 100 includes a winding temperature characteristic model 101 and a stator temperature characteristic model 102 as sub models that form the calculation model 100 itself as illustrated in FIG. 1. The winding temperature characteristic model 101 is a model for calculating temperature characteristics of the winding when thermal influences of the stator are virtually excluded from the motor, and the stator temperature characteristic model 102 is a model for calculating temperature characteristics of the stator when the thermal influences of the winding are virtually excluded from the motor. In this manner, the calculation model 100 includes both models and is further configured such that the temperature of the winding of the motor is calculated in consideration of the correlation between the stator and the winding by a sum of outputs of the respective models being calculated as the temperature of the winding of the motor as illustrated in FIG. 1.

Here, the winding temperature characteristic model 101 will be described. The winding temperature characteristic model 101 includes a heat resistance Ra and a heat time constant Ta related to the winding, which are parameters (winding-related parameters) in relation to the temperature characteristics of the winding, and is represented by Formula 1 described below. Note that the heat resistance Ra is a value representing how difficult it is to transmit heat and is a parameter that represents the amount of temperature rise per thermal amount generated in a unit time. In the embodiment, a heat resistance when the winding of the motor is considered as a thermally homogeneous substance is employed. Also, the heat time constant Ta is a parameter representing a degree of responsiveness to a change in the temperature of the winding and is defined as a time required for the winding to change by 63.2% of a temperature difference when the winding transitions from a thermal equilibrium state to another thermal equilibrium state.

$$\text{Winding temperature characteristic model} = Ra/(Ta \cdot s + 1) \quad \text{(Formula 1)}$$

Next, the stator temperature characteristic model 102 will be described. The stator temperature characteristic model 102 includes a heat resistance Rb and a heat time constant Tb related to the stator, which are parameters (stator-related parameters) in relation to the temperature characteristics of the stator, and is represented by Formula 2 described below. Note that the definition of the heat resistance Rb is the same as the definition of the aforementioned heat resistance Ra, and in the embodiment, the heat resistance when the stator of the motor is considered as a thermally homogeneous substance is employed. Also, the heat time constant Tb is a parameter representing a degree of responsiveness to a change in the temperature of the stator and is defined in the same manner as the aforementioned heat time constant Ta.

$$\text{Stator temperature characteristic model} = Rb/(Tb \cdot s + 1) \quad \text{(Formula 2)}$$

Then, an input (a heat flow in the motor) is given to the winding temperature characteristic model 101 and the stator temperature characteristic model 102 in the calculation model 100. In addition, outputs of the respective models are added to obtain an output of the calculation model, that is, an estimated temperature of the winding of the motor. Note that values obtained by multiplying the outputs of the respective models by a predetermined gain may be added when the outputs of the respective models are added. It is possible to estimate the temperature of the winding of the motor in consideration of the correlation between the stator and the winding by the calculation model 100 being configured in this manner.

Next, calculation of the heat resistance Ra and the heat time constant Ta used in the winding temperature characteristic model 101 and calculation of the heat resistance Rb and the heat time constant Tb used in the stator temperature characteristic model 102 will be described with reference to FIG. 2. Note that these parameters Ra, Rb, Ta, and Tb will also collectively be referred to as model parameters. In the transition of the applied voltage illustrated in the upper section in FIG. 2, the first voltage is applied in an application of a voltage to the motor in order to raise the temperature of the winding from a temperature t0 in an initial equilibrium state to a first temperature t1 in an equilibrium state in a period from a time T1 to a time T2. Since the temperature of the winding of the motor rises as illustrated in the lower section in FIG. 2 in the period from the time T1 to the time T2, the temperature transition of the winding in this period will be referred to as a "rising transition." When the first voltage is applied, a voltage V1 is applied such that a current flows only through a d axis and the rotor of the motor does not rotate. The voltage V1 applied at this time may be any applied voltage that suitably raises the temperature of the motor to calculate the model parameter and can be a voltage corresponding to a rated power of the motor, for example.

Further, in the transition of the applied voltage illustrated in the upper section in FIG. 2, a second voltage is applied in an application of a voltage to the motor in order to lower the temperature of the winding from the equilibrium state at the temperature t1 to an equilibrium state at a second temperature t2 in a period from a time T2 to a time T3 after the time T2 at which the temperature of the winding converges on the first temperature. Since the temperature of the winding of the motor is lowered as illustrated in the lower section in FIG. 2 in the period from the time T2 to the time T3, the temperature transition of the winding in this period will be referred to as a "falling transition." The voltage applied when the second voltage is applied in the embodiment illustrated in FIG. 2 is represented as V2, and the voltage V2 is as low as possible in order to significantly lower the temperature of the winding of the motor 2. Also, substantially no voltage may be applied to the motor, that is, the voltage V2 may be 0 V in the application of the second voltage. Such a mode in which no voltage is applied, in other words, a voltage application mode in which the applied voltage is set to 0 V, is also included in the application of the second voltage. The voltage is applied such that the rotor of the motor does not rotate even at the time of the application of the second voltage.

Then, the model parameters Ra, Rb, Ta, and Tb are calculated on the basis of the rising transition from time T1 to time T2 and the falling transition from the time T2 to the time T3. Since heat capacity of the winding can be considered to be sufficiently smaller than heat capacity of the stator in the motor, it is possible to ignore thermal influences of the winding in the falling transition during which power fed to the motor is relatively small. Therefore, it is reasonable to consider the thermal influences of the stator to be dominant in the falling transition. Thus, the heat resistance Rb and the heat time constant Tb related to the temperature characteristics of the stator are calculated on the basis of the falling transition. Specifically, the time required for the temperature of the winding to be lowered from T1 by 63.2% of a temperature difference T2−T1 is considered as the heat time constant Tb. Also, the heat resistance Rb is calculated on the basis of the temperature difference T2−T1 and the power fed at that time.

Here, the temperature transition of the winding in the rising transition can be considered to be formed as a result of a correlation between the thermal characteristics of the winding itself and the thermal characteristics of the stator. Thus, a heat resistance R' and a heat time constant T' in relation to temperature characteristics in a case in which the stator and the winding are considered to be integrated on the basis of the rising transition are calculated, and influences of the heat resistance Rb and the heat time constant Tb in relation to the stator that have already been calculated are excluded therefrom, thereby calculating the heat resistance Ra and the heat time constant Ta in relation to the temperature characteristics of the winding.

The winding temperature characteristic model 101 and the stator temperature characteristic model 102 are formed using the thus calculated model parameters, and the calculation model 100 including both models is decided. It is possible to estimate the temperature of the winding of the motor in consideration of the correlation between the stator and the winding using the thus decided calculation model 100.

First Embodiment

Figure 3:
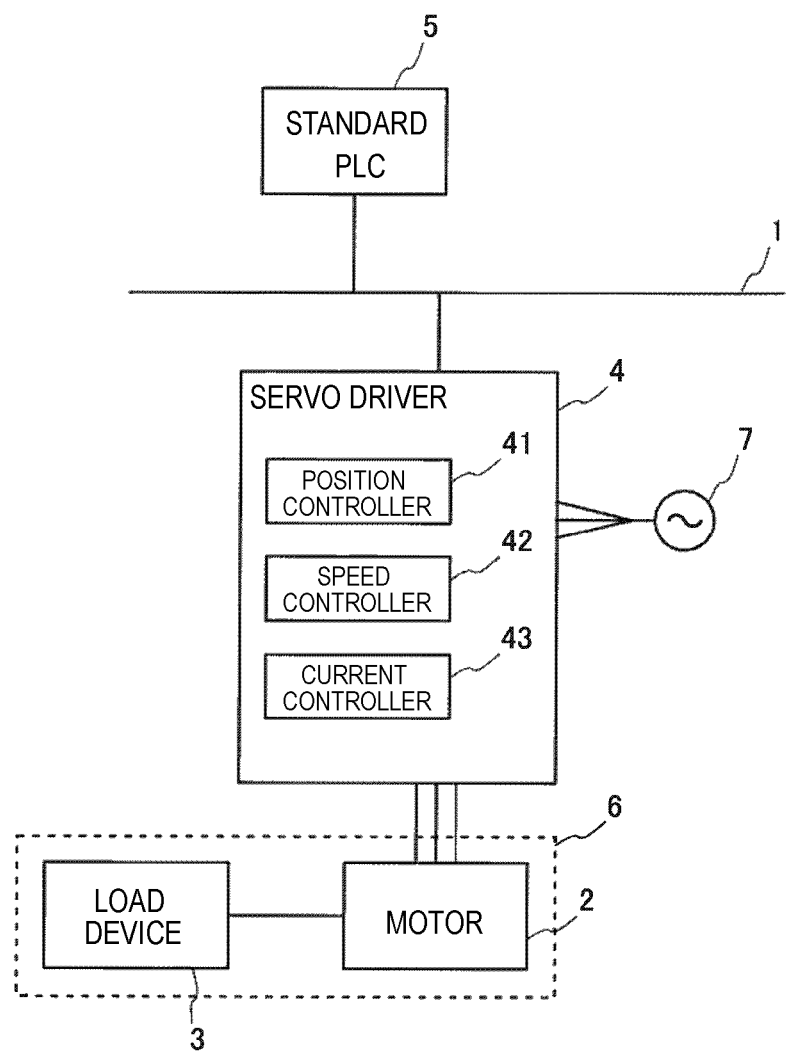
FIG. 3 is a schematic configuration of a control system configured with the motor incorporated.

FIG. 3 is a schematic configuration diagram of a control system including a servo driver 4 that also operates as the processing device according to the embodiment. The control system includes a network 1, a motor 2, a load device 3, a servo driver 4, and a standard programmable logic controller (PLC) 5. The control system is a system for controlling driving of the load device 3 with the motor 2. In addition, the motor 2 and the load device 3 are control targets 6 controlled by the control system. Here, it is possible to exemplify various mechanical devices (an industrial robot arm and a transport device, for example) as the load device 3. Also, the motor 2 is incorporated in the load device 3 as an actuator for driving the load device 3. For example, the motor 2 is an AC servo motor that has a stator around which a winding is wound and a rotor. Note that an encoder, which is not illustrated, is attached to the motor 2, and a parameter signal in relation to an operation of the motor 2 is feedback-transmitted to the servo driver 4 by the encoder. This feedback-transmitted parameter signal (hereinafter, referred to as a feedback signal) includes, for example, positional information regarding a rotation position (angle) of a rotation axis of the motor 2, information regarding a rotation speed of the rotation axis, and the like.

The servo driver 4 receives an operation command signal in relation to an operation (motion) of the motor 2 from the standard PLC 5 via the network 1 and receives the feedback signal output from the encoder connected to the motor 2. The servo driver 4 calculates a command value in relation to servo control related to driving of the motor 2, that is, an operation of the motor 2 on the basis of the operation command signal from the standard PLC 5 and the feedback signal from the encoder and supplies a drive current to the motor 2 such that the operation of the motor 2 conforms to the command value. Note that as the supplied current, AC power fed from an AC power source 7 to the servo driver 4 is used. In this embodiment, the servo driver 4 is of a type of receiving a three-phase AC current, the servo driver 4 may be of a type of receiving a single-phase AC current. Note that the servo control performed by the servo driver 4 is feedback control using a position controller 41, a speed controller 42, and a current controller 43 included in the servo driver 4, and details thereof will be described later with reference to FIG. 2.

Figure 4:
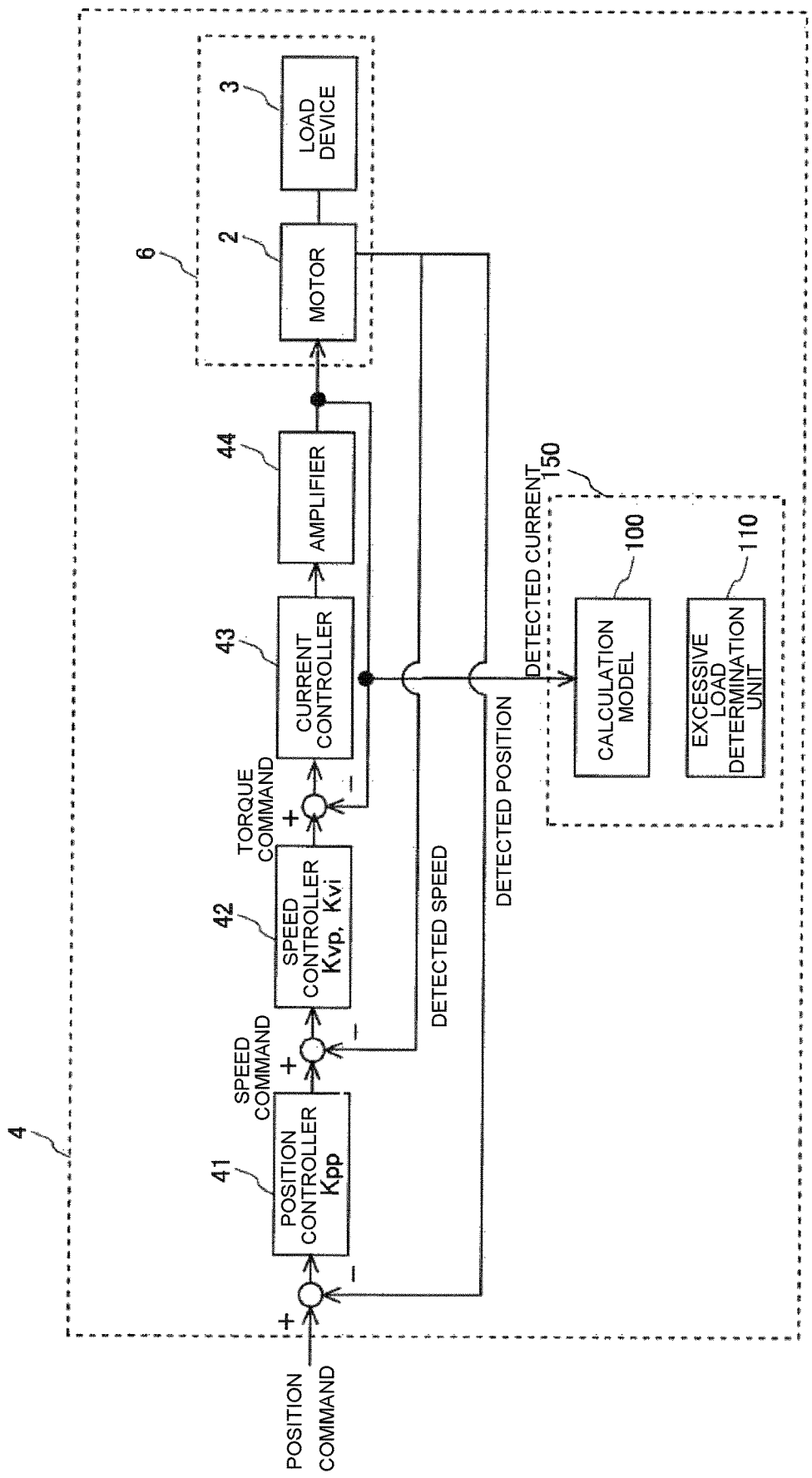
FIG. 4 is a first diagram illustrating a control structure formed of a servo driver in the control system illustrated in FIG. 3.

Here, the servo driver 4 includes the position controller 41, the speed controller 42, and the current controller 43 as illustrated in FIG. 3, and the aforementioned servo control is executed through processing thereof. In addition, the servo driver 4 has an electronic thermal unit 150 (see FIG. 4) for protecting the motor 2 from being damaged due to an excessive load. The electronic thermal unit 150 estimates a temperature of the winding of the motor 2 and determines an excessive load state of the motor 2 on the basis of the estimated temperature. Thus, the servo control performed by the servo driver 4 and protection control for the motor 2 performed by the electronic thermal unit 150 will be described on the basis of a control structure formed in the servo driver 4 as illustrated in FIG. 4. The control structure is formed by a predetermined control program being executed in the servo driver 4 that has a predetermined arithmetic operation device, a memory, and the like.

The position controller 41 performs proportional control (P control), for example. Specifically, a speed command is calculated by multiplying a positional deviation that is a deviation between a position command provided as a notification from the standard PLC 5 and a detected position by a position proportional gain Kpp. Note that the position controller 41 has the position proportional gain Kpp as a control parameter in advance. Next, the speed controller 42 performs proportional integration control (PI control), for example. Specifically, a torque command is calculated by multiplying an integrated amount of a speed deviation that is a deviation between a speed command calculated by the position controller 41 and a detected speed by a speed integration gain Kvi and multiplying a sum of the calculation result and the speed deviation by a speed proportional gain Kvp. Note that the speed controller 42 has the speed integration gain Kvi and the speed proportional gain Kvp as control parameters in advance. In addition, the speed controller 42 may perform the P control instead of the PI control. In this case, the speed controller 42 has the speed proportional gain Kvp as a control parameter in advance. Next, the current controller 43 generates a command voltage for driving an amplifier 44 on the basis of the torque command calculated by the speed controller 42. The amplifier 44 outputs a drive current for driving the motor 2 in accordance with the generated command voltage, and driving of the motor 2 is thus controlled. The current controller 43 includes a filter (primary low-pass filter) or one or more notch filters in relation to the notch command and has, control parameters, cutoff frequency and the like in relation to performance of these filters.

In addition, the control structure of the servo driver 4 includes a speed feedback system including, as forward elements, the speed controller 42, the current controller 43, and the control target 6 and further includes a position feedback system including, as forward elements, the speed feedback system and the position controller 41. With the control structure configured in this manner, the servo driver 4 can perform servo control on the motor 2 in accordance with a position command supplied from the standard PLC 5.

If an excessive load (a load exceeding a rated load of the motor 2, for example) is imparted on the motor 2 for a relatively long time when the servo control is performed on the motor 2 in this manner, an excessive current flows through the winding of the motor 2 for a long time, and there is thus a concern that the temperature of the winding excessively rises and this leads to burning. In order to avoid such driving of the motor 2 in an excessive load state, the servo driver 4 has the electronic thermal unit 150. Specifically, the electronic thermal unit 150 has the calculation model 100 illustrated in FIG. 1 and an excessive load determination unit 110. As described above, the calculation model 100 includes the winding temperature characteristic model 101 and the stator temperature characteristic model 102, and if a heat flow in the motor 2 is given as an input, the calculation model 100 outputs the temperature of the winding on which the winding of the motor 2 can converge, as a result. Then, the excessive load determination unit 110 determines whether or not there is a probability that the motor 2 reaches the excessive load state, in other words, whether or not there is a concern that the temperature of the winding of the motor 2 excessively rises, on the basis of the temperature of the winding that is an output of the calculation model 100. Note that in a case in which the excessive load determination unit 110 determines that the motor 2 is in the excessive load state, the servo driver 4 can stop the driving of the motor 2 in order to protect the motor 2.

Figure 5:
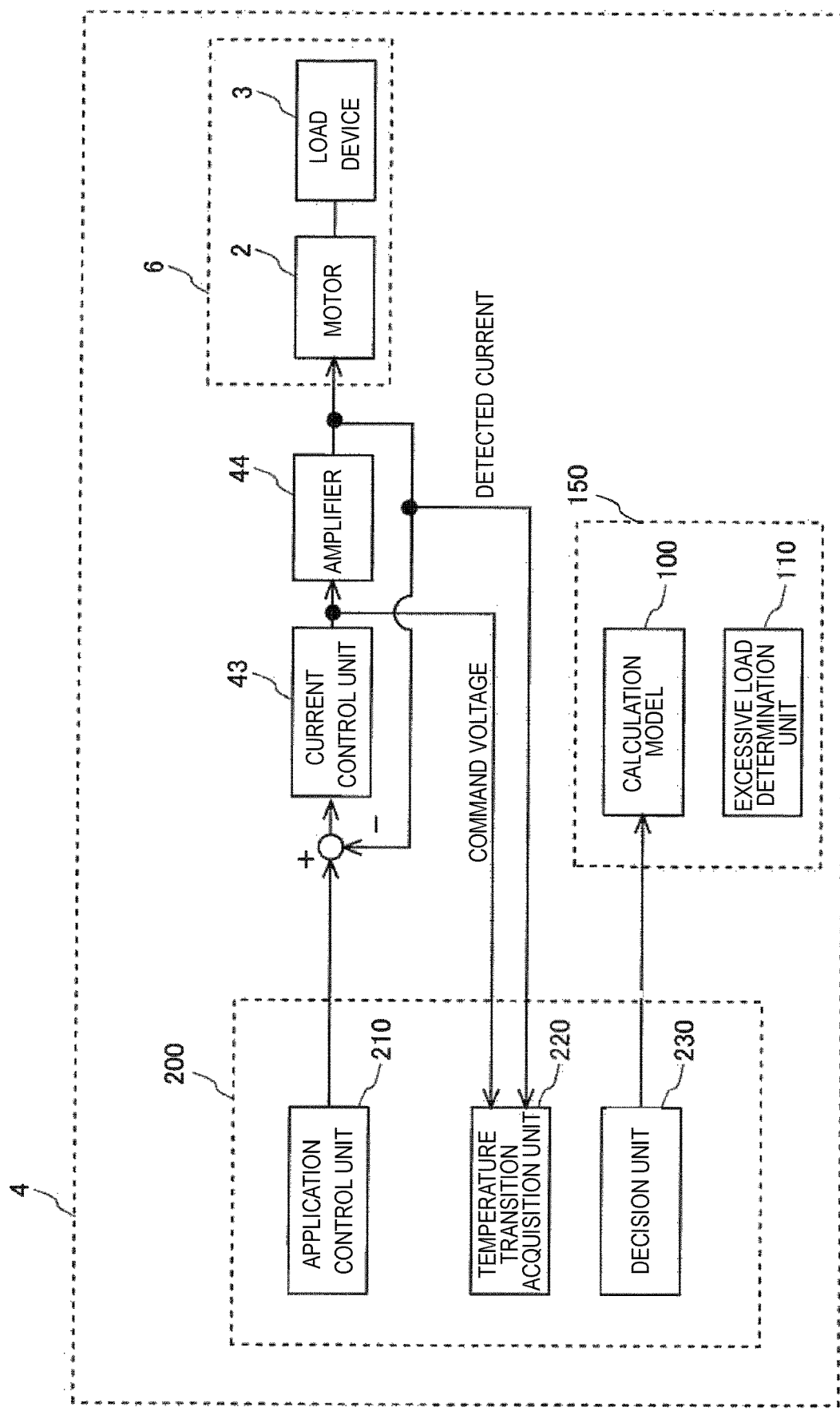
FIG. 5 is a second diagram illustrating a control structure formed of a servo driver in the control system illustrated in FIG. 3.

Here, a control structure for adapting the calculation model 100 included in the electronic thermal unit 150 to the motor 2 as a control target of the servo driver 4 will be described with reference to FIG. 5. The servo driver 4 has a model adaptation unit 200 for adapting the calculation model 100 to the motor 2. The model adaptation unit 200 calculates the model parameters of the calculation model 100 corresponding to the motor 2, that is, the heat resistance Ra and the heat time constant Ta of the winding temperature characteristic model 101 and the heat resistance Rb and the heat time constant Tb of the stator temperature characteristic model 102 corresponding to the motor 2 and causes the calculation model 100 to be adapted to the motor 2 using these values. Note that since the current controller 43 and the amplifier 44 illustrated in FIG. 4 are used while the position controller 41 and the speed controller 42 are not used when the calculation model 100 is adapted, illustration of the position controller 41 and the speed controller 42 is omitted in FIG. 5.

Here, the model adaptation unit 200 has an application control unit 210, a temperature transition acquisition unit 220, and a decision unit 230. The application control unit 210 outputs, to the current controller 43, a command for applying the voltage for calculating the model parameters of the calculation model 100, that is, for applying the first voltage and the second voltage illustrated in the upper section in FIG. 2. Note that the application of the voltage by the application control unit 210 is controlled suitably for calculating the model parameters using the temperature of the winding of the motor 2 acquired by the temperature transition acquisition unit 220, which will be described later, and other parameters.

The temperature transition acquisition unit 220 acquires transition of the temperature of the winding when the calculation model 100 is adapted, that is, the rising transition and the falling transition illustrated in the lower section in FIG. 3 on the basis of a resistance value of the winding of the motor 2. The temperature of the winding is acquired in accordance with Formula 3 described below.

Temperature θ2 of winding=$R2/R1\cdot(234.5+\theta1)-234.5$ (Formula 3)

R1 represents a resistance value of the winding when the application of the voltage is started (the time T1 in FIG. 2).

θ1 represents a temperature of the winding when the application of the voltage is started. For example, an atmospheric temperature in an environment in the surroundings of the motor 2 (in a case in which it is possible to acquire the atmospheric temperature with the servo driver 4) or a detection value of a temperature sensor included in the encoder that is attached to the motor 2 can be used as θ1.

R2 represents a resistance value of the winding when the voltage is applied. Note that acquisition of the resistance value R2 of the winding will be described later.

The temperature transition acquisition unit 220 sequentially acquires the temperature of the winding of the motor 2 at that time in accordance with Formula 3 at the same time as the application of the voltage by the application control unit 210.

The decision unit 230 calculates the heat resistance Ra and the heat time constant Ta of the winding temperature characteristic model 101 and the heat resistance Rb and the heat time constant Tb of the stator temperature characteristic model 102 corresponding to the motor 2 on the basis of the rising transition and the falling transition acquired by the temperature transition acquisition unit 220. These model parameters are calculated as described above. Further, the decision unit 230 applies the calculated model parameters to the winding temperature characteristic model 101 and the stator temperature characteristic model 102 of the calculation model 100 and decides each model. As a result, the calculation model 100 for the electronic thermal unit 150 illustrated in FIG. 1 is adapted to the motor 2 itself that i controlled by the servo driver 4.

Figure 6:
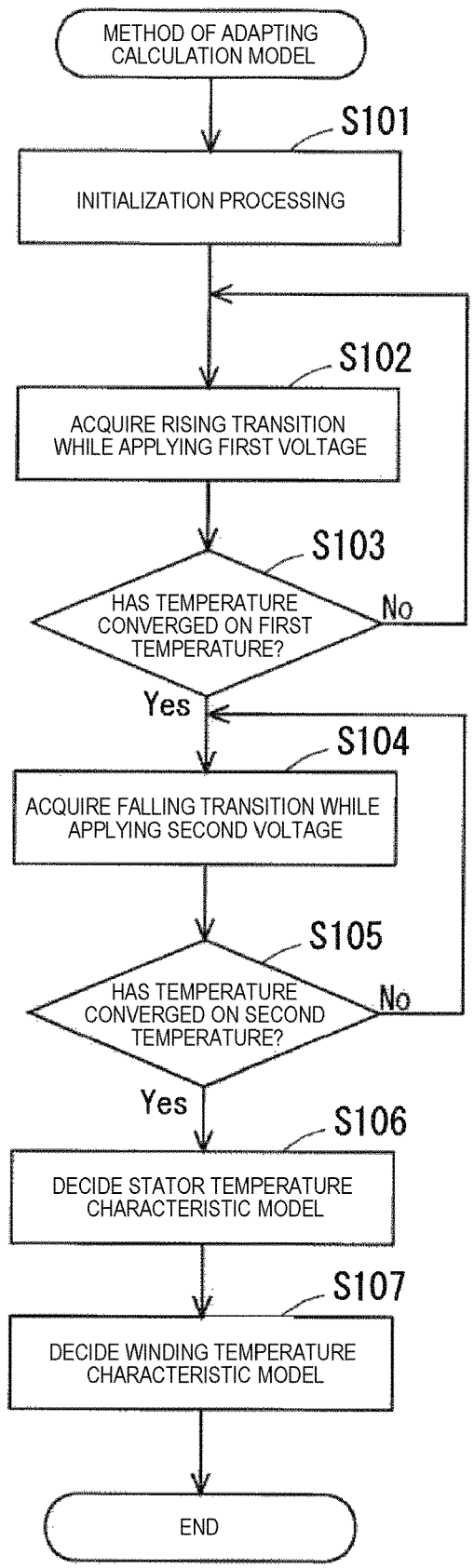
FIG. 6 is a first flowchart illustrating a flow of processing for a method of adapting a calculation model to the motor, which is executed by the servo driver.

Here, a method of adapting the calculation model 100 using the model adaptation unit 200 will be described with reference to FIG. 6. FIG. 6 is a flowchart illustrating a flow of the method of adapting the calculation model 100 using the model adaptation unit 200. First, in S101, initialization processing of acquiring the resistance value (R1 in Formula 3) of the winding of the motor 2 and the temperature (θ1 in Formula 3) of the winding is performed immediately before starting the application of the first voltage using the application control unit 210. The resistance value of the winding is calculated on the basis of a current value when a voltage for measurement is applied between terminals of the motor. In addition, the temperature of the winding in the initialization processing can also be considered to be about the same as the external temperature since the motor 2 is placed in the surrounding environment for a sufficiently long time. Thus, the external temperature or the temperature detected by the temperature sensor in the encoder installed in the motor 2 is acquired as the temperature of the winding in the initialization processing.

Next, in S102, the temperature transition acquisition unit 220 acquires rising transition of the temperature of the winding of the motor 2 while the application control unit 210 applies the first voltage. Here, if it is attempted to separately apply a voltage for calculating the resistance value when the temperature of the winding rises due to the application of the first voltage, the temperature rising control through the application of the first voltage is inhibited. Since it is necessary to raise the temperature of the winding of the motor 2 to the first temperature t1 in the application of the first voltage, it becomes difficult to suitably calculate the model parameters (the heat resistances and the heat time constants) if the temperature rise is disturbed when the resistance value is calculated. Thus, according to the embodiment, the voltage is periodically applied in the application of the first voltage to raise the temperature of the winding through the application of the voltage, and the resistance value of the winding of the motor 2 is calculated using a frequency response of the current to the application of the voltage when the application of the voltage is used as an input to the motor 2 and the current flowing through the winding is used as an output.

Figure 7:
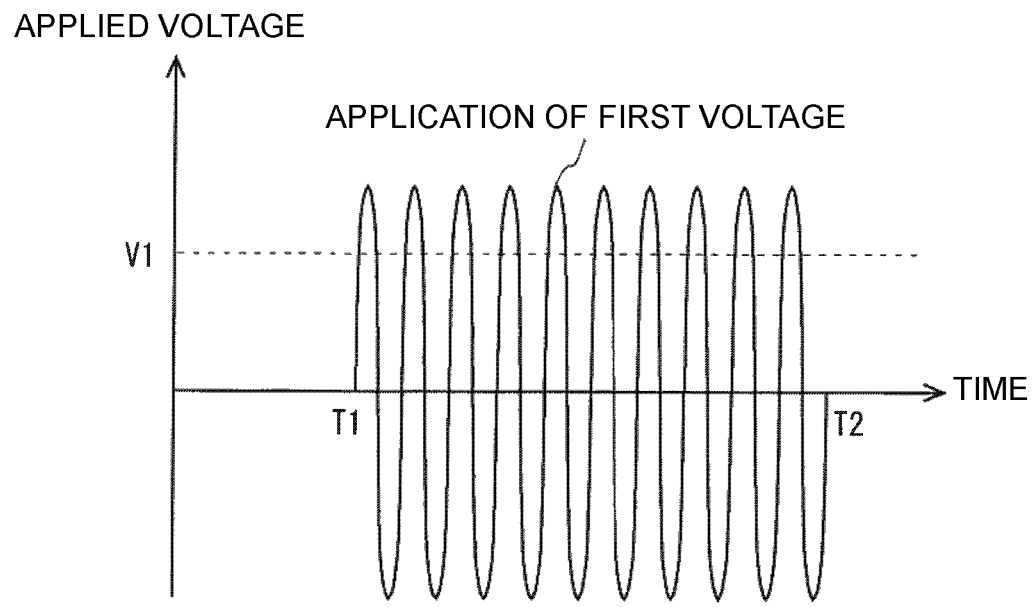
FIG. 7 is a diagram illustrating transition of a voltage applied to the motor.
Figure 7:
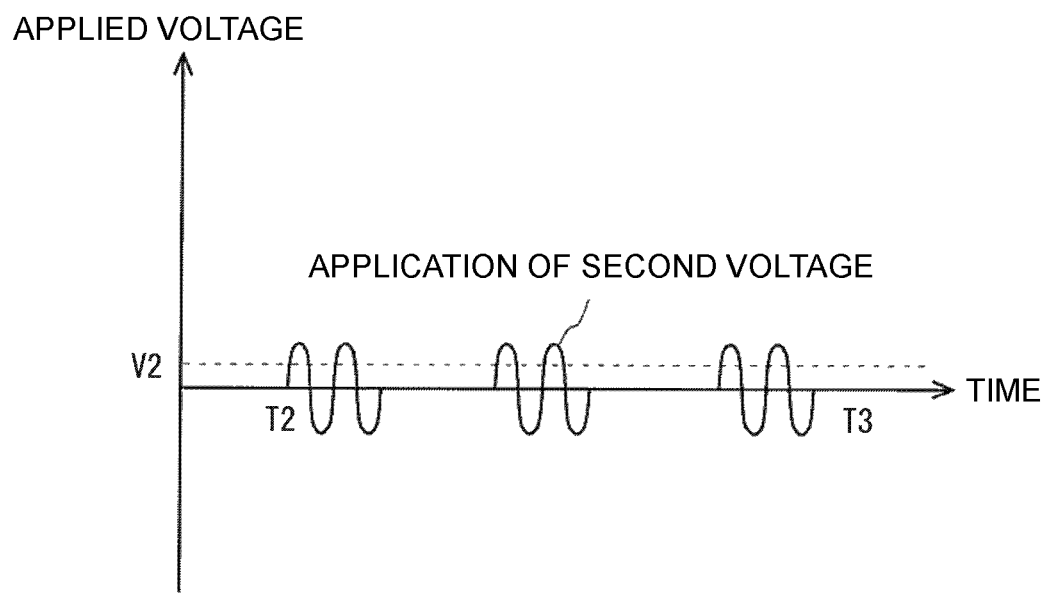

Specifically, a periodic sine wave voltage is applied in an application period (T1 to T2) in the application of the first voltage as illustrated in the upper section of FIG. 7. At this time, an effective value (a square mean value) of the sine wave voltage is the voltage V1 illustrated in FIG. 2. In this manner, it is possible to raise the temperature of the winding of the motor 2 to the first temperature t1 by applying the periodic sine wave voltage in the application of the first voltage. Here, the temperature transition acquisition unit 220 acquires the applied voltage value and the value of the current flowing through the winding of the motor 2 as an input value and an output value, respectively, when the periodic voltage application is performed. A frequency response of the output value to the input value reflects electrical characteristics of the motor 2 represented by Formula 4 described below.

Electrical characteristics of motor2:$(1/R) \cdot (1/(Ts+1))$ (Formula 4)

However, R represents a resistance of the winding of the motor 2, and T represents an electric time constant of the motor 2.

Thus, the temperature transition acquisition unit 220 calculates the frequency response of the output value and uses a gain $G(\omega)$ and a phase $P(\omega)$ obtained on the basis of the frequency response to further calculate the resistance R of the winding of the motor 2 in accordance with Formula 5 described below.

[Mathematical equation 1]

$$R = \frac{1}{G(\omega)\sqrt{1 + (\tan P(\omega))^2}}$$ (Formula 5)

Further, the temperature transition acquisition unit 220 substitutes the resistance R of the winding calculated by Formula 5 into R2 in Formula 3 and calculates the temperature ($\theta$2 in Formula 3) of the winding at the timing at which the frequency response is acquired.

In this manner, the temperature transition acquisition unit 220 can acquire the rising transition of the temperature of the winding using the resistance value of the winding without inhibiting the temperature raising processing (the processing of raising the temperature of the winding to the first temperature t1) of the motor 2 using the frequency response of the current flowing through the winding of the motor 2 when the first voltage is applied. Note that the acquisition timing of the rising transition of the temperature of the winding using the temperature transition acquisition unit 220, that is, the acquisition timing of the frequency response may appropriately be set within a range in which it is possible to acquire rising transition to such an extent that the model parameters can be calculated.

Note that although the sine wave voltage is continuously applied in the application period in the example illustrated in the upper section of FIG. 7, the sine wave voltage may be intermittently applied as long as the temperature of the winding of the motor 2 can converge on the equilibrium state at the first temperature t1. At this time, a squire mean value of the intermittent sine wave voltage in the application period is the voltage V1. In addition, the period of the applied voltage in the application of the first voltage may appropriately be decided as long as it is possible to acquire an appropriate frequency response for calculating the resistance value of the winding. The temperature of the winding tends to suddenly change due to the application of the voltage if the period of the applied voltage becomes excessively long, and meanwhile, it becomes difficult to suitably reflect electric characteristics of the motor 2 to the frequency response if the period of the applied voltage becomes excessively short. Thus, the frequency of the applied sine wave voltage is set to ⅓ to 3 times or ½ to 2 times the frequency corresponding to a reciprocal number of an electric time constant of the motor 2 or is set to be a frequency at the same magnification. In this manner, it is possible to realize adjustment of the temperature and acquisition of the temperature of the motor 2 with a satisfactory balance.

Next, in S103, it is determined whether or not the temperature of the winding of the motor 2 acquired by the temperature transition acquisition unit 220 has converged on the first temperature t1. For example, it may be determined that the rising of the temperature of the winding of the motor 2 has converged when a change rate of the rising becomes equal to or less than a predetermined threshold value. The change rate of the rising can be defined as the amount of a temperature rise of the winding per unit time. In addition, the threshold value may be a predefined fixed value, or in another method, the threshold value may be decided with reference to a change rate of rising of the temperature of the winding immediately after the starting of the application of the first voltage, that is, a change rate of rising that can be considered to be the highest in the application period, and for example, a value corresponding to ¹⁄₁₀ of the change rate of rising that is assumed to be the maximum may be used as the threshold value. The processing proceeds to S104 if positive determination is made in S103, or the processing in and after S102 is repeated to continue the application of the first voltage since the temperature of the winding has not converged on the first temperature t1 if negative determination is made.

Next, in S104, the temperature transition acquisition unit 220 acquires falling transition of the temperature of the winding of the motor 2 while the application control unit 210 applies the second voltage. Note that a voltage is periodically applied, and as a result, the temperature of the winding is lowered in terms of acquisition of the temperature of the winding in the application of the second voltage in a manner similar to the case in which the first voltage is applied. Specifically, a periodic sine wave voltage is intermittently applied in an application period (T2 to T3) in the application of the second voltage as illustrated in the lower section of FIG. 7. At this time, a squire mean value of the intermittent sine wave voltage in the application period is the voltage V2. Then, the temperature transition acquisition unit 220 calculates a frequency response of a current value in a manner similar to the processing in S102 described above using the applied voltage value when such a sine wave voltage is applied and the value of the current flowing through the winding of the motor 2. Further, the temperature transition acquisition unit 220 calculates the resistance R of the winding of the motor 2 in accordance with Formula 5 described above using the gain $G(\omega)$ and the phase $P(\omega)$ obtained from the frequency response and finally calculates the temperature of the winding when the second voltage is applied in accordance with Formula 3 described above.

If it is attempted to apply the voltage to the winding of the motor in order to detect the resistance value of the winding, and the application time becomes long, this leads to an unnecessary temperature rise of the winding, and suitable falling transition of the temperature of the winding is inhibited. However, since it is possible to shorten the voltage application time for acquiring the resistance value and to reduce the amount of energy fed to the winding using the frequency response as described above, it is possible to acquire the falling transition of the temperature of the winding using the resistance value of the winding without inhibiting the falling transition (the processing of lowering the temperature of the winding to the second temperature t2) of the motor 2. Also, a minimum voltage is applied in the application of the second voltage in consideration of falling of the temperature of the winding and causing the temperature of the winding to converge on the second temperature in the application of the second voltage. That is, the voltage may be applied as long as calculation of the temperature of the winding based on the frequency response is secured in the application of the second voltage. In this manner, it is possible to reduce power consumption of the motor 2 to the maximum extent.

Next, in S105, it is determined whether or not the temperature of the winding of the motor 2 acquired by the temperature transition acquisition unit 220 has converged on the second temperature t2. For example, it may be determined that the falling of the temperature of the winding of the motor 2 has converged when a change rate of the falling becomes equal to or less than a predetermined threshold value. The change rate of the falling can be defined as the amount of falling of the temperature of the winding per unit time. In addition, the threshold value may be a predefined fixed value, or in another method, the threshold value may be decided with reference to a change rate of falling of the temperature of the winding immediately after the starting of the application of the second voltage, that is, a change rate of falling that can be considered to be the highest in the application period, and for example, a value corresponding to $\frac{1}{10}$ of the change rate of falling that is assumed to be the maximum may be used as the threshold value. The processing proceeds to S106 if positive determination is made in S105, or the processing in and after S104 is repeated to continue the application of the second voltage since the temperature of the winding has not converged on the second temperature t2 if negative determination is made.

Then, in S106, the heat resistance Rb and the heat time constant Tb that are model parameters of the stator temperature characteristic model 102 are calculated, and the model is decided, on the basis of the falling transition acquired in S104 as described above with reference to FIGS. 1 and 2. Further, in S107, the heat resistance Ra and the heat time constant Ta that are model parameters of the winding temperature characteristic model 101 are calculated, and the model is decided, on the basis of the rising transition acquired in S102 and the model parameters calculated in S106 as similarly described above with reference to FIGS. 1 and 2.

According to the method of adapting the calculation model illustrated in FIG. 6, it is possible to prepare the suitable calculation model 100 adapted to the motor 2 that is driven by the servo driver 4 as described above. In this manner, it is possible to accurately calculate the temperature of the winding using the electronic thermal unit 150 and to suitably protect the motor 2 from an excessive load when the motor 2 is driven.

Modification Example

In the method of adapting the calculation model illustrated in FIG. 6, the winding temperature characteristic model 101 and the stator temperature characteristic model 102 are decided on the basis of the acquired rising transition and falling transition. Incidentally, in a case in which the stator temperature characteristic model 102 is known in relation to the motor 2, it is not necessary to acquire the aforementioned rising transition and falling transition. In such a case, it is possible to acquire the rising transition through the processing in S101 to S103 in the method of adapting the calculation model illustrated in FIG. 6 and to decide the winding temperature characteristic model 101 on the basis of the acquired rising transition and the known stator temperature characteristic model 102. That is, it is not necessary to acquire the falling transition through S104 and S105 in this case. Note that it is for the electronic thermal unit 150 to hold the known stator temperature characteristic model 102, and information of the held known stator temperature characteristic model 102 is used when the winding temperature characteristic model 101 is decided.

Second Embodiment

A second method of adapting the calculation model 100 will be described with reference to FIGS. 8 and 9. According to the stator of the motor 2, there is a case in which an "iron loss" in which the stator itself generates heat due to an eddy current caused by a change in a magnetic force due to rotation of the rotor significantly appears. The iron loss increases as the rotation speed of the rotor increases, and this may affect the temperature of the winding of the motor 2 in an unignorable level.

Figure 8:
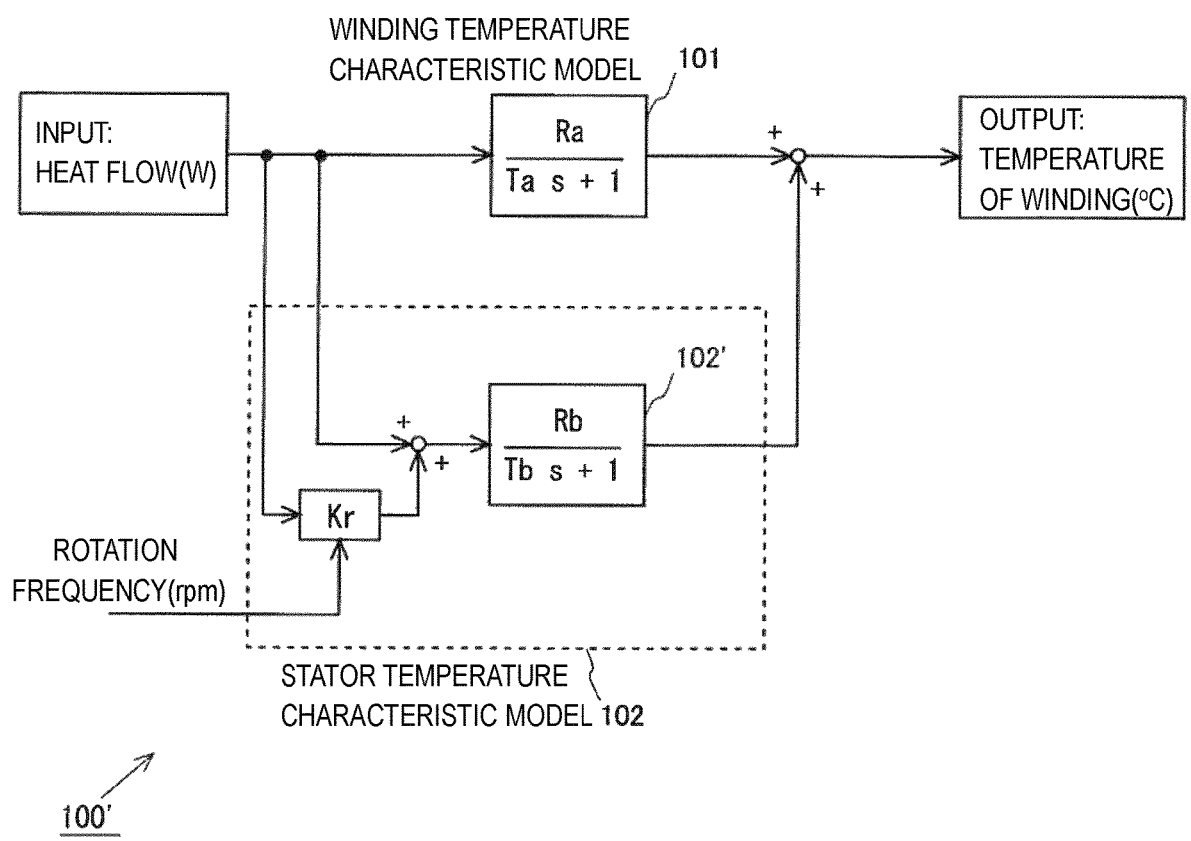
FIG. 8 is a second diagram illustrating a configuration of a calculation model including a winding temperature characteristic model and a stator temperature characteristic model
Figure 9:
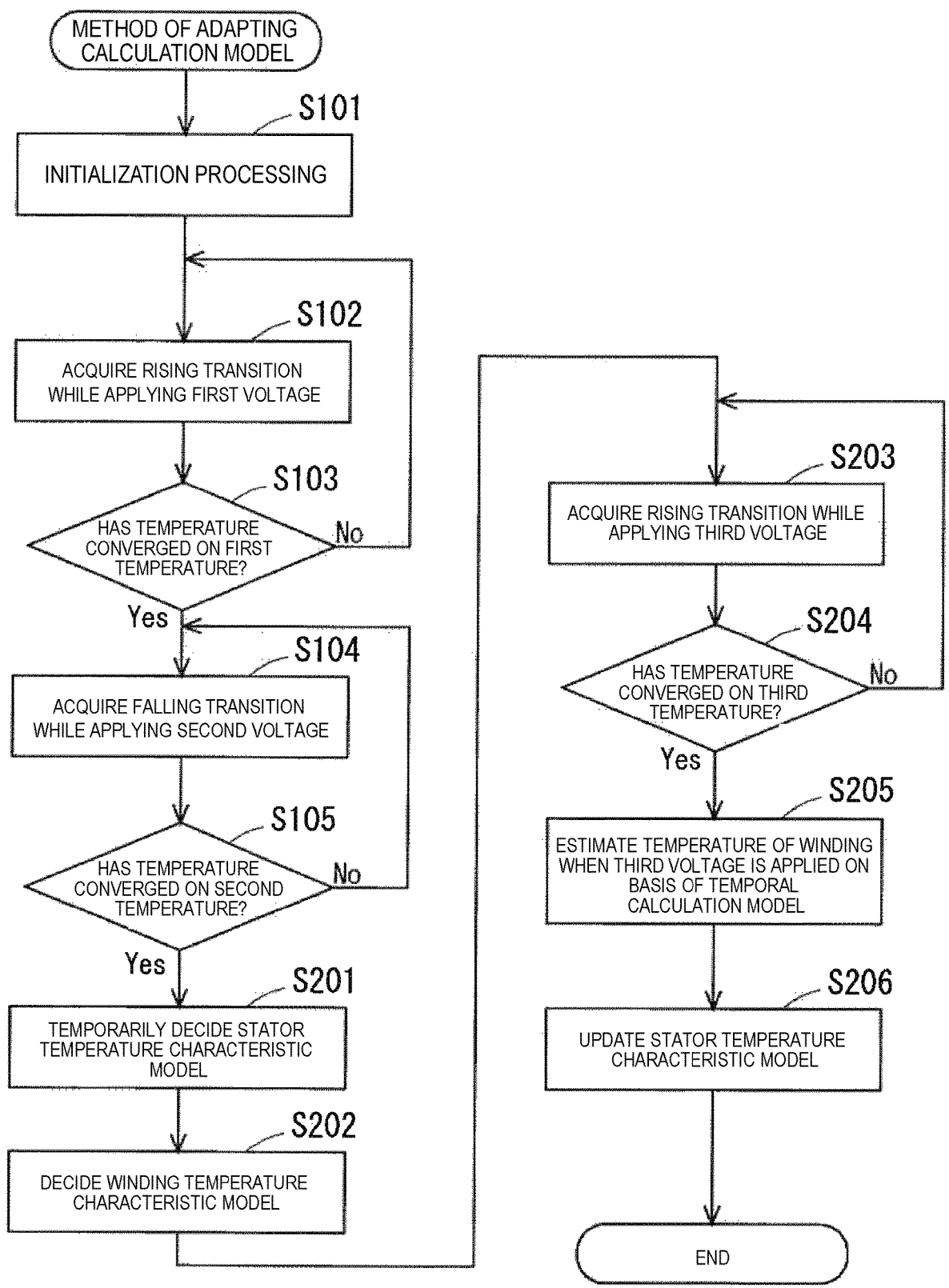
FIG. 9 is a second flowchart illustrating a flow of processing for a method of adapting a calculation model to the motor, which is executed by the servo driver.

Thus, the calculation model included in the electronic thermal unit 150 is a calculation model 100' illustrated in FIG. 8 in this embodiment. The calculation model 100' includes a winding temperature characteristic model 101 and a stator temperature characteristic model 102 as illustrated in FIG. 8, and a configuration of the stator temperature characteristic model 102 is different from that in the calculation model 100 illustrated in FIG. 1. The stator temperature characteristic model 102 in the calculation model 100' includes a reference model 102' and an iron coefficient Kr that uses a rotation speed (rpm) of the rotor of the motor 2 as an argument. The reference model 102' are substantially the same as the stator temperature characteristic model 102 in the calculation model 100. A numerical value of the iron loss coefficient Kr can vary in accordance with the rotation speed of the rotor. In the stator temperature characteristic model 102 in the calculation model 100', a value obtained by multiplying an input heat flow by (1+Kr) is input to the reference model 102', thereby calculating an output of the stator temperature characteristic model 102. It is possible to react the iron loss caused by the rotation of the rotor to the temperature characteristics of the stator by the calculation model 100' having such a stator temperature characteristic model 102, and it is possible to more suitably realize the estimation of the temperature of the winding of the motor 2 for protection from an excessive load.

Thus, a method of adapting the model parameters of the calculation model 100' to the motor 2 will be described with reference to FIG. 9. Note that the same reference numerals will be given to processing that is substantially the same as the processing in the flowchart in FIG. 6 in the processing illustrated in the flowchart in FIG. 9, and detailed description thereof will be omitted. S101 to S105 in FIG. 9 are the same as S101 to S105 in FIG. 6. Thus, processing in and after S201 will be described in the embodiment.

In S201, a heat resistance Rb and a heat time constant Tb that are model parameters of the stator temperature characteristic model 102 are calculated on the basis of falling transition acquired in S104, and the model is temporarily decided as described above in the first embodiment. Note that the "temporal decision" described herein depends on decision of the iron loss coefficient Kr in S206, which will be described later, and final decision of the stator temperature characteristic model 102. Next, the iron loss coefficient Kr is set to "0" at the timing of S201. Next, S202 is processing that is substantially the same as S107 in the first example. That is, in S202, a heat resistance Ra and a heat time constant Ta that are model parameters of the winding temperature characteristic model 101 are calculated on the basis of rising transition acquired in S102 and model parameters calculated in S201, and the model is decided. Since the winding temperature characteristic model 101 is not updated later unlike the stator temperature characteristic model 102, this decision is final decision rather than temporal decision.

Next, in S203, the temperature transition acquisition unit 220 acquires rising transition of the temperature of the winding of the motor 2 while the application control unit 210 applies the third voltage. In the application of the third voltage, the voltage is periodically applied as in the application of the first voltage, and the temperature of the winding is raised through the application of the voltage. Note that in the application of the third voltage, the rotor of the motor 2 is brought into a state in which the rotor rotates at a predetermined rotation speed, that is a rotating and temperature rising state by a drive current flowing not only through a d axis but also through a q axis. Therefore, the temperature of the winding of the motor 2 is raised, the temperature of the stator is also raised due to the iron loss when the third voltage is applied, and the transition of the temperature of the winding at this time is regarded as rising transition during rotation. Also, the voltage applied in the application of the third voltage may be a voltage that is the same as the voltage V1 applied in the application of the first voltage or may be a different voltage. Further, a resistance value of the winding of the motor 2 is calculated using the frequency response of a current to the application of a voltage when the application of the voltage is used as an input to the motor 2 and the current flowing through the winding is used as an output when the third voltage is applied, as in the application of the first voltage.

Next, in S204, it is determined whether or not the temperature of the winding of the motor 2 acquired by the temperature transition acquisition unit 220 has converged on the third temperature t3 when the third voltage is applied. For example, it may be determined that the rising of the temperature of the winding of the motor 2 has converged when a change rate of the rising becomes equal to or less than a predetermined threshold value. The processing proceeds to S205 if positive determination is made in S204, and the processing in and after S203 is repeated if negative determination is made.

In S205, the temperature of the winding of the motor 2, which is reached through the application of the third voltage, at which the temperature is assumed to converge, is estimated on the basis of the temporal calculation model formed to include the stator temperature characteristic model temporarily decided in S201 and the winding temperature characteristic model decided in S202. Specifically, a heat flow when the third voltage is applied is calculated on the basis of the applied current at that time, and the heat flow is input to the temporal calculation model, thereby performing the estimation.

It is possible to state that the temperature of the winding estimated in S205 in this manner is a temperature of the winding calculated in accordance with the calculation model that does not take the iron loss at the stator into consideration. Meanwhile, it is possible to state that the convergence temperature (third temperature) of the winding that has been raised through the application of the third voltage is the temperature of the winding to which the iron loss at the stator has been reflected. Therefore, a difference between the temperature of the winding estimated in S205 and the third temperature can be considered as an influence of the iron loss at the stator on the winding. Thus, in S206, the iron loss coefficient Kr is calculated in accordance with Formula 6 described below when the difference between the temperature of the winding estimated in S205 and the third temperature is assumed to ΔT, $$Kr = \Delta T/(\omega \cdot Rb) \qquad \text{(Formula 6)}$$

However, ω represents the predetermined rotation speed when the third voltage is applied.

The iron loss coefficient Kr is calculated in accordance with Formula 6, and the iron loss coefficient Kr is reflected to the stator temperature characteristic model 102 in the calculation model 100' illustrated in FIG. 8, thereby updating the stator temperature characteristic model 102 temporarily decided in S210. As a result, the iron loss at the stator is reflected to the stator temperature characteristic model 102, and it is thus possible to more suitably estimate the temperature of the winding of the motor 2 and to suitably realize the protection of the motor 2 from an excessive load using the electronic thermal unit 150.

Note that although the iron loss at the stator of the motor 2 depends on the rotation speed of the rotor, the degree of dependency significantly varies depending on various factors of a laminated electromagnetic steel plates of the stator, a magnetic force of the rotor, and the like. In a case in which the iron loss significantly varies relative to the rotation speed in a rotation range of the rotor, the processing in S203 to S206 may be performed in accordance with a plurality of rotation speeds, and the stator temperature characteristic model 102 may be updated to include a plurality of iron loss coefficients Kr in accordance with the respective rotation speeds. In this case, the iron loss coefficients Kr are configured as functions of the rotation speeds such that values of the iron loss coefficients Kr vary on the basis of the rotation speeds input to the stator temperature characteristic model 102.

Other Embodiments

Although the model adaptation unit 200 is formed in the servo driver 4 in the embodiments as described above, the model adaptation unit 200 may be formed in a processing device (a personal computer (PC), for example) that can electrically be connected to the servo driver 4 instead of the mode. The processing device is a device for adapting the calculation model to the motor 2, and software (program) for adaptation is mounted thereon. Specifically, the processing device is a computer that has an arithmetic operation device, a memory, and the like, a program that can be executed in the computer is installed thereon, and the method of adapting the calculation model described in FIG. 6 or 9 is realized by the program being executed.

The dimensions, the materials, the shapes, the relative disposition thereof, the orders of the respective processes included in the described methods, and the like described in the aforementioned embodiments are not intended to limit the technical scope of the present disclosure only to them unless particularly stated otherwise.

SUPPLEMENTARY NOTE

A processing device (4) that decides a calculation model (100), the calculation model (100) being included in an electronic thermal (150) of a motor (2) that has a stator around which a winding is wound and a rotor to estimate a temperature of the winding and including a winding temperature characteristic model (101) that includes winding-related parameters in relation to temperature characteristics of the winding and a stator temperature characteristic model (102) that includes stator-related parameters in relation to temperature characteristics of the stator, the processing device including:

a temperature transition acquisition unit (220) that acquires (S102) rising transition of the temperature of the winding in a state in which a first voltage is applied in order to raise the temperature of the winding to a first temperature and further acquires (S104) falling transition of the temperature of the winding in a state in which a second voltage is applied in order to lower the temperature of the winding to a second temperature that is lower than the first temperature after the temperature of the winding converges on the first temperature; and a decision unit (230) that calculates the stator-related parameters on the basis of the falling transition to decide (S106) the stator temperature characteristic model and further calculates the winding-related parameters on the basis of the rising transition and the decided stator temperature characteristic model to decide (S107) the winding temperature characteristic model.

A method of deciding a winding temperature calculation model (100), the calculation model (100) being included in an electronic thermal (150) of a motor (2) that has a stator around which a winding is wound and a rotor to estimate a temperature of the winding and including a winding temperature characteristic model (101) that includes winding-related parameters in relation to temperature characteristics of the winding and a stator temperature characteristic model (102) that includes stator-related parameters in relation to temperature characteristics of the stator, the processing device including:

acquiring (S102) rising transition of the temperature of the winding in a state in which a first voltage is applied in order to raise the temperature of the winding to a first temperature;

acquiring (S104) falling transition of the temperature of the winding in a state in which a second voltage is applied in order to lower the temperature of the winding to a second temperature that is lower than the first temperature after the temperature of the winding converges on the first temperature;

calculating (S106) the stator-related parameters on the basis of the falling transition and deciding the stator temperature characteristic model; and calculating (S107) the winding-related parameters on the basis of the rising transition and the decided stator temperature characteristic model and deciding the winding temperature characteristic model.

A program for deciding a winding temperature calculation model, the calculation model being included in an electronic thermal (150) of a motor (2) that has a stator around which a winding is wound and a rotor to estimate a temperature of the winding and including a winding temperature characteristic model (101) that includes winding-related parameters in relation to temperature characteristics of the winding and a stator temperature characteristic model (102) and including stator-related parameters in relation to temperature characteristics of the stator, the program causing a processing device (4) configured to decide the calculation model (100) to perform:

acquiring (S102) rising transition of the temperature of the winding in a state in which a first voltage is applied in order to raise the temperature of the winding to a first temperature;

acquiring (S104) falling transition of the temperature of the winding in a state in which a second voltage is applied in order to lower the temperature of the winding to a second temperature that is lower than the first temperature after the temperature of the winding converges on the first temperature;

calculating (S106) the stator-related parameters on the basis of the falling transition and deciding the stator temperature characteristic model; and calculating (S107) the winding-related parameters on the basis of the rising transition and the decided stator temperature characteristic model and deciding the winding temperature characteristic model.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A processing device that decides a calculation model, wherein an electronic thermal of a motor includes the calculation model, the motor has a stator around which a winding is wound and a rotor, the calculation model is configured to estimate a temperature of the winding, and the calculation model includes a winding temperature characteristic model and a stator temperature characteristic model, wherein the winding temperature characteristic model includes winding-related parameters in relation to temperature characteristics of the winding, and the stator temperature characteristic model includes stator-related parameters in relation to temperature characteristics of the stator, wherein the processing device acquires a rising transition of the temperature of the winding in a state in which a first voltage is applied in order to raise the temperature of the winding to a first temperature, and the processing device further acquires a falling transition of the temperature of the winding in a state in which a second voltage is applied in order to lower the temperature of the winding to a second temperature that is lower than the first temperature after the temperature of the winding converges on the first temperature; and the processing device calculates the stator-related parameters on the basis of the falling transition to decide the stator temperature characteristic model, and the processing device further calculates the winding-related parameters on the basis of the rising transition and the decided stator temperature characteristic model to decide the winding temperature characteristic model, wherein the winding temperature characteristic model is a model for calculating temperature characteristics of the winding when thermal influences of the stator are excluded from the motor, and the winding temperature characteristic model is decided based on the decided stator temperature characteristic model and the winding-related parameters, wherein the winding-related parameters comprise a heat resistance and a heat time constant, the heat resistance is a parameter that represents the amount of temperature rise per thermal amount generated in a unit time, and the heat time constant is a parameter representing a degree of responsiveness to a change in the temperature of the winding.

2. The processing device according to claim 1, wherein the processing device acquires the rising transition and the falling transition on the basis of a resistance value of the winding.

3. The processing device according to claim 2,
wherein the processing device acquires the rising transition and the falling transition in a state in which the rotor does not rotate,
the processing device decides the stator temperature characteristic model and the winding temperature characteristic model on the basis of the rising transition and the falling transition acquired in the state in which the rotor does not rotate, and
the processing device further applies a third voltage for raising the temperature of the winding in a state in which the rotor is caused to rotate at a predetermined rotation speed and acquires a rising transition in a state in which the rotor rotates, which is a temperature transition of the winding,
the processing device estimates a convergence temperature of the winding in the rising transition in the state in which the rotor rotates on the basis of a voltage application condition at the time of the application of the third voltage and the stator temperature characteristic model and the winding temperature characteristic model decided by the processing device, and
the processing device updates the stator temperature characteristic model decided by the processing device to a new stator temperature characteristic model on the basis of a convergence temperature of the winding in the acquired rising transition in the state in which the rotor rotates and the estimated convergence temperature of the winding.

4. The processing device according to claim 2, wherein
the processing device acquires a frequency response in the motor when a voltage applied to the winding is used as an input and a current flowing through the winding is used as an output; and
the processing device calculates the resistance value of the winding on the basis of the frequency response.

5. The processing device according to claim 4,
wherein the processing device acquires the rising transition and the falling transition in a state in which the rotor does not rotate,
the processing device decides the stator temperature characteristic model and the winding temperature characteristic model on the basis of the rising transition and the falling transition acquired in the state in which the rotor does not rotate, and
the processing device further applies a third voltage for raising the temperature of the winding in a state in which the rotor is caused to rotate at a predetermined rotation speed and acquires a rising transition in a state in which the rotor rotates, which is a temperature transition of the winding,
the processing device estimates a convergence temperature of the winding in the rising transition in the state in which the rotor rotates on the basis of a voltage application condition at the time of the application of the third voltage and the stator temperature characteristic model and the winding temperature characteristic model decided by the processing device, and
the processing device updates the stator temperature characteristic model decided by the processing device to a new stator temperature characteristic model on the basis of a convergence temperature of the winding in the acquired rising transition in the state in which the rotor rotates and the estimated convergence temperature of the winding.

6. The processing device according to claim 4,
wherein a voltage of a first cycle is applied in the application of the first voltage, and a voltage of a second cycle is applied in the application of the second voltage, and
the processing device calculates the resistance value of the winding when the first voltage is applied on the basis of the frequency response acquired by the processing device in accordance with an output current of the motor when the application of the voltage of the first cycle is input, and the processing device calculates the resistance value of the winding when the second voltage is applied on the basis of the frequency response acquired by the processing device in accordance with an output current of the motor when the application of the voltage of the second cycle is input, and
the processing device acquires the rising transition and the falling transition on the basis of the resistance value of the winding calculated by the processing device.

7. The processing device according to claim 6,
wherein the processing device acquires the rising transition and the falling transition in a state in which the rotor does not rotate,
the processing device decides the stator temperature characteristic model and the winding temperature characteristic model on the basis of the rising transition and the falling transition acquired in the state in which the rotor does not rotate, and
the processing device further applies a third voltage for raising the temperature of the winding in a state in which the rotor is caused to rotate at a predetermined rotation speed, and the processing device acquires a rising transition in a state in which the rotor rotates,
the processing device estimates a convergence temperature of the winding in the rising transition in the state in which the rotor rotates on the basis of a voltage application condition at the time of the application of the third voltage and the stator temperature characteristic model and the winding temperature characteristic model decided by the processing device, and
the processing device updates the stator temperature characteristic model decided by the processing device to a new stator temperature characteristic model on the basis of a convergence temperature of the winding in the acquired rising transition in the state in which the rotor rotates and the estimated convergence temperature of the winding.

8. The processing device according to claim 1,
wherein the processing device acquires the rising transition and the falling transition in a state in which the rotor does not rotate,
the processing device decides the stator temperature characteristic model and the winding temperature characteristic model on the basis of the rising transition and the falling transition acquired in the state in which the rotor does not rotate, and
the processing device further applies a third voltage for raising the temperature of the winding in a state in which the rotor is caused to rotate at a predetermined rotation speed, and the processing device acquires a rising transition in a state in which the rotor rotates, which is a temperature transition of the winding, the processing device estimates a convergence temperature of the winding in the rising transition in the state in which the rotor rotates on the basis of a voltage application condition at the time of the application of the third voltage and the stator temperature characteristic model and the winding temperature characteristic model decided by the processing device, and the processing device updates the stator temperature characteristic model decided by the processing device to a new stator temperature characteristic model on the basis of a convergence temperature of the winding in the acquired rising transition in the state in which the rotor rotates and the estimated convergence temperature of the winding.

9. A method of deciding a calculation model, wherein an electronic thermal of a motor includes the calculation model, the motor has a stator around which a winding is wound and a rotor, the calculation model is configured to estimate a temperature of the winding, and the calculation model includes a winding temperature characteristic model and a stator temperature characteristic model, wherein the winding temperature characteristic model includes winding-related parameters in relation to temperature characteristics of the winding, and the stator temperature characteristic model includes stator-related parameters in relation to temperature characteristics of the stator, the method comprising:

acquiring a rising transition of the temperature of the winding in a state in which a first voltage is applied in order to raise the temperature of the winding to a first temperature;

acquiring a falling transition of the temperature of the winding in a state in which a second voltage is applied in order to lower the temperature of the winding to a second temperature that is lower than the first temperature after the temperature of the winding converges on the first temperature;

calculating the stator-related parameters on the basis of the falling transition and deciding the stator temperature characteristic model; and calculating the winding-related parameters on the basis of the rising transition and the decided stator temperature characteristic model and deciding the winding temperature characteristic model, wherein the winding temperature characteristic model is a model for calculating temperature characteristics of the winding when thermal influences of the stator are excluded from the motor, and the winding temperature characteristic model is decided based on the decided stator temperature characteristic model and the winding-related parameters, wherein the winding-related parameters comprise a heat resistance and a heat time constant, the heat resistance is a parameter that represents the amount of temperature rise per thermal amount generated in a unit time, and the heat time constant is a parameter representing a degree of responsiveness to a change in the temperature of the winding.

10. A non-transitory computer-readable recording medium, storing a program for deciding a calculation model, wherein an electronic thermal of a motor includes the calculation model, the motor that has a stator around which a winding is wound and a rotor, and the calculation model is configured to estimate a temperature of the winding; and the calculation model includes a winding temperature characteristic model and a stator temperature characteristic model, wherein the winding temperature characteristic model includes winding-related parameters in relation to temperature characteristics of the winding, and the stator temperature characteristic model includes stator-related parameters in relation to temperature characteristics of the stator, the program causes a processing device configured to decide the calculation model to perform:

acquiring a rising transition of the temperature of the winding in a state in which a first voltage is applied in order to raise the temperature of the winding to a first temperature;

acquiring a falling transition of the temperature of the winding in a state in which a second voltage is applied in order to lower the temperature of the winding to a second temperature that is lower than the first temperature after the temperature of the winding converges on the first temperature;

calculating the stator-related parameters on the basis of the falling transition and deciding the stator temperature characteristic model; and calculating the winding-related parameters on the basis of the rising transition and the decided stator temperature characteristic model and deciding the winding temperature characteristic model, wherein the winding temperature characteristic model is a model for calculating temperature characteristics of the winding when thermal influences of the stator are excluded from the motor, and the winding temperature characteristic model is decided based on the decided stator temperature characteristic model and the winding-related parameters, wherein the winding-related parameters comprise a heat resistance and a heat time constant, the heat resistance is a parameter that represents the amount of temperature rise per thermal amount generated in a unit time, and the heat time constant is a parameter representing a degree of responsiveness to a change in the temperature of the winding.

11. A processing device that decides a calculation model, wherein an electronic thermal of a motor includes the calculation model, the motor has a stator around which a winding is wound and a rotor, the calculation model is configured to estimate a temperature of the winding, and the calculation model includes a winding temperature characteristic model and a known stator temperature characteristic model, wherein the winding temperature characteristic model includes winding-related parameters in relation to temperature characteristics of the winding, and the known stator temperature characteristic model includes stator-related parameters in relation to temperature characteristics of the stator, wherein the processing device acquires a rising transition at which the temperature of the winding converges on a first temperature in a state in which a first voltage is applied in order to raise the temperature of the winding to the first temperature; and the processing device calculates the winding-related parameters on the basis of the rising transition and the known stator temperature characteristic model, and the processing device decides the winding temperature characteristic model, wherein the winding temperature characteristic model is a model for calculating temperature characteristics of the winding when thermal influences of the stator are excluded from the motor, and the winding temperature characteristic model is decided based on the known stator temperature characteristic model and the winding-related parameters,
wherein the winding-related parameters comprise a heat resistance and a heat time constant, the heat resistance is a parameter that represents the amount of temperature rise per thermal amount generated in a unit time, and the heat time constant is a parameter representing a degree of responsiveness to a change in the temperature of the winding.

* * * * *